June 1, 1948.  W. E. MAST ET AL  2,442,501
CHOCK BLOCK
Filed Oct. 19, 1946
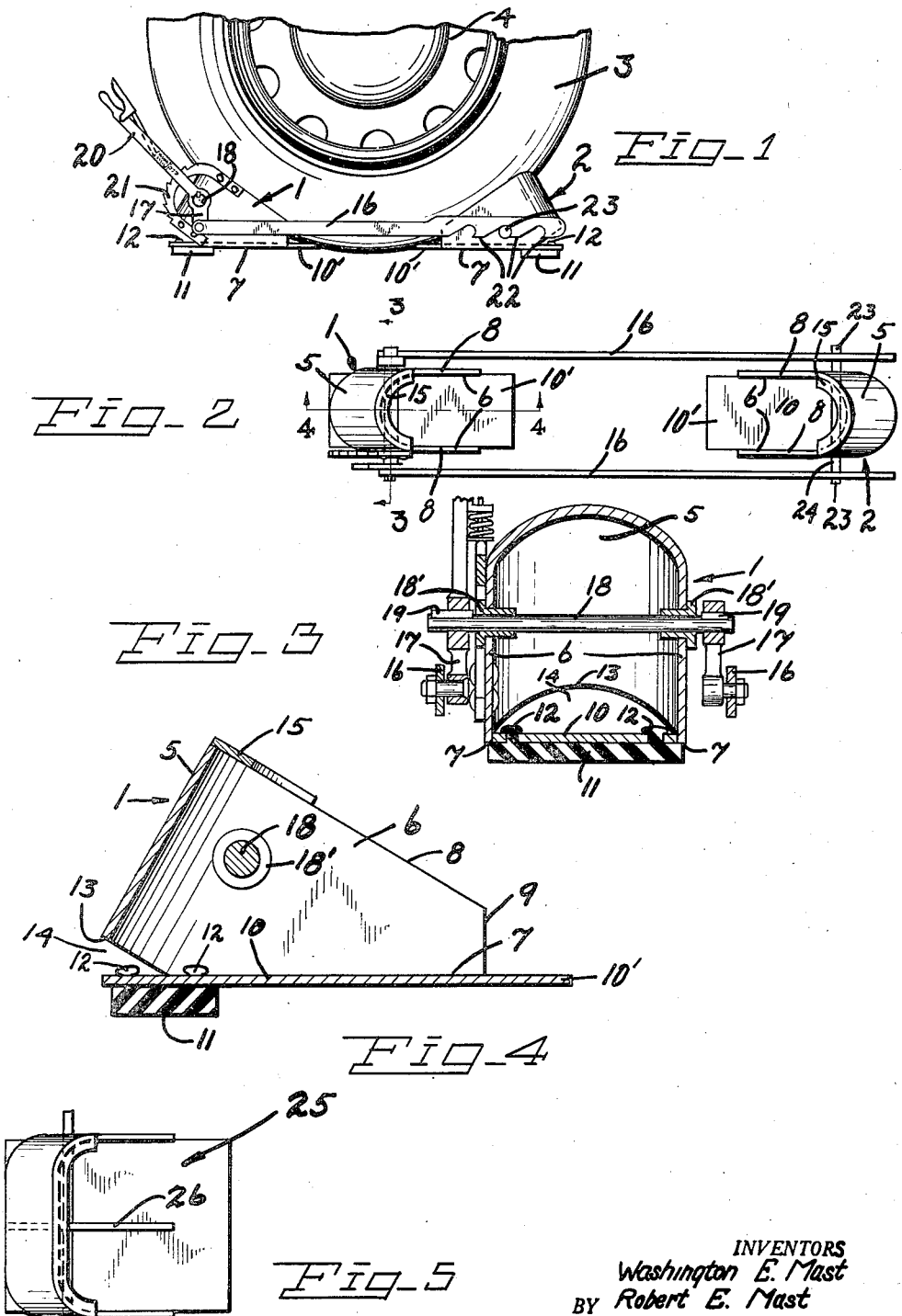
INVENTORS
Washington E. Mast
Robert E. Mast
BY
Glenn L. Fisk
ATTORNEY Patented June 1, 1948

2,442,501

UNITED STATES PATENT OFFICE 2,442,501

CHOCK BLOCK

Washington E. Mast and Robert E. Mast,
Spokane, Wash.

Application October 19, 1946, Serial No. 704,390

4 Claims. (Cl. 188—32)

This invention relates to chocks for vehicle wheels and it is one object of the invention to provide a device of this character which may be set in place upon a street or road and serve very effectively to prevent a wheel from rolling either forwardly or rearwardly. It will thus be seen that if an automobile or moving van or truck is to be parked upon a street or road having sufficient grade to cause the vehicle to coast down hill one or more of the improved chocks may be placed upon the highway surface and have such engagement with a wheel or wheels of the vehicle that the vehicle can not coast down hill while an attendant is away from the vehicle and cause damage.

Another object of the invention is to provide a chock so constructed that blocks constituting elements of the chock may be moved into position for wedging engagement with front and rear portions of a tire of a wheel and held in a set position where they will very effectively prevent the wheel from turning either forwardly or rearwardly.

Another object of the invention is to provide a chock wherein one of its blocks is detachably engaged by bars or strips extending from arms carried by a shaft rotatably mounted through the other block, the said shaft carrying a lever having a rack associated with it so that after the lever has been moved to turn the shaft and cause the blocks to have tight wedging engagement with a tire the blocks may be firmly secured in the adjusted position.

Another object of the invention is to provide a chock which is of simple construction and may be manufactured at low cost.

The invention is illustrated in the accompanying drawings wherein:

Fig. 1 is a side view showing the improved chock in use.

Fig. 2 is a top plan view of the improved chock.

Fig. 3 is a sectional view taken transversely through the chock along the line 3—3 of Figure 2.

Fig. 4 is a sectional view taken through one block of the chock along the line 4—4 of Figure 2.

Fig. 5 is a top plan view of a modified form of block.

This improved chock consists briefly of two blocks 1 and 2, one of which is shiftable longitudinally toward the other so that the two blocks may be moved into wedging engagement with the tire 3 of a wheel 4 and prevent the wheel from rolling forwardly or rearwardly along a street, road, or other highway upon which a vehicle is parked.

The blocks 1 and 2 are of substantially duplicate construction and each is formed of strong metal and has a transversely curved end wall 5 and side walls 6 which merge into the end wall at opposite sides thereof. The side walls have horizontally extending lower edges 7 and diagonally extending upper edges 8 which extend downwardly toward their inner ends, inner ends of the side walls having straight-cut vertical edges 9. The lower edge faces of the side walls 6 are firmly secured along opposite side edges of a base plate 10 which projects from the side walls of the block so that at its inner end each block has a lip 10' which is provided so that the blocks may be easily forced into place under front and rear portions of the tread of a tire. Rubber pads 11 are mounted under outer end portions of the base plates 10 by lugs 12 and serve to frictionally grip the surface of the road or street upon which the blocks rest and prevent sliding of the blocks along the said surface. The lower edges 13 of the curved end walls 5 are spaced upwardly from outer ends of the base plates to provide openings 14 through which water may flow and thus prevent water from accumulating in the blocks and freezing to a tire during cold weather. Arcuate guard plates 15 prevent the shoes from cutting the tire.

In order to adjustably connect block 2 with block 1 and allow them to be drawn into tight wedging engagement with front and rear portions of the tire there have been provided metal bars or strips 16 which extend longitudinally of the chock and are pivoted at their outer ends to arms 17 which are mounted about ends of a shaft 18 which passes through bearings 18', the arms being anchored to the shaft by keys 19 so that they have swinging movement when the shaft is turned. One of the arms 17 constitutes an extension of a latch lever 20 which extends across an arcuate rack 21 mounted against a side wall of the block 1 and from an inspection of Figures 1 and 2 it will be seen that when the lever is moved the shaft will be rotated and the arms 17 swung to shift the bars 16 longitudinally. The free end portions of the bars are formed along their lower edges with teeth 22 for selective engagement with pins 23 formed by ends of a rod 24 mounted transversely through the block 2, and from an inspection of Figure 1 it will be seen that by swinging the bars upwardly out of engagement with the pins they will be released from the block 2. The blocks may then be placed upon the highway and shifted longitudinally into abutting engagement with front and rear portions of the tire and during such movement of the block 1 the bars will move along opposite sides of the tire and their free end portions move across the pins. During this movement of the blocks into engagement with the tire the lever is in a lowered position so that after the pins are engaged by selected ones of the teeth 23 and the lever swung upwardly pull will be exerted by longitudinal movement of the bars and the two blocks forced toward each other and the lips 10' of the base plates forced under the tread portion of the tire and the blocks moved into tight wedging engagement with the tire. The wheel will thus be blocked against turning forwardly or rearwardly and a vehicle will be prevented from coasting down hill from a position in which it has been parked. When the chock is to be removed it is merely necessary to swing the lever downwardly and the bars will be moved longitudinally out of gripping engagement with the pins 23 and the blocks may be moved out of wedging engagement with the tire and lifted from the roadway upon which they rest.

In Figure 5 there has been shown a block which is intended for use for blocking a wheel having two tires or for a vehicle having multiple wheels instead of single wheels. This block 25 is similar in construction to the blocks 1 and 2 except that it is wider and is provided with a partition plate 26 which extends longitudinally of the block midway the width thereof and provides accommodation for two tires instead of one tire. In other respects the block 25 is of the same construction as blocks 1 and 2 and it is therefore not described in detail. It will be obvious that by providing a block of greater width and additional plates 26 three or more tires may be accommodated.

We claim:

1. A wheel chock comprising blocks for engaging under front and rear portions of a wheel, a shaft rotatably mounted transversely through one block, arms fixed to and extending downwardly from said shaft at opposite sides of the said block, bars pivoted at ends to said arms and extending longitudinally of the said block along opposite sides thereof and projecting therefrom and along opposite sides of the second block, the second block having pins projecting outwardly from its opposite sides, said bars having free end portions provided along their lower side edges with teeth spaced from each other longitudinally of the bars and adapted to slide across the pins in one direction into position for selective gripping engagement with the pins, a rack carried by the first block, and a latch lever carried by said shaft for rotating the shaft and swinging the arms to shift the bars longitudinally and cause teeth engaged with the pins to exert pulling force upon the pins and shift the blocks toward each other into wedging engagement with the front and rear portions of the wheel, said latch lever having engagement with the rack to releasably hold the lever in an adjusted position.

2. A wheel chock comprising blocks for engaging under front and rear portions of a wheel, each block being open along its top and having a transversely curved end wall and side walls merging into the end wall, a base plate, the side walls being secured along their lower edges to side edge portions of the base plate and the end wall having its lower edge spaced upwardly from the base plate, the said base plate having an inner end portion projecting from the side walls to form a lip for engaging under the tread portion of a wheel, and means for connecting the blocks in longitudinal spaced relation to each other and releasably holding the blocks in wedged engagement with front and rear portions of the wheel.

3. A chock comprising blocks for engaging under front and rear portions of a tire of a vehicle wheel, said blocks each having a base plate and an outer end wall and side walls extending from the end wall along the base plate and tapered toward the inner end of the base plate, the inner end portion of the base plate being extended beyond the side wall and forming a lip for engagement under the tread portion of a tire, a shaft rotatably mounted through one block, arms extending from said shaft, a rack carried by the said block, a latch lever fixed to said shaft for turning the shaft and by engagement with said rack holding the shaft stationary with the arms in an adjusted position, bars pivoted to said arms and extending along the said block at opposite sides with free end portions extending along opposite sides of the second block and formed with teeth, and pins projecting from opposite sides of the second block and releasably engaged by said pins to connect the second block with the first block and cause the blocks to be shifted toward each other into wedging engagement with front and rear portions of the tread of a tire when the lever is moved to turn the shaft and swing the arms in a direction to exert pull upon the bars.

4. A chock comprising blocks for engaging under front and rear portions of the tread of a tire on a vehicle wheel and preventing forward and rearward rotation of the wheel, each block being open along its top and having an outer end wall and side walls tapered toward their inner ends, a guard plate mounted along the end wall and adjoining portions of the side walls for preventing cutting of a tire by contact with the upper edge of the end wall, a shaft rotatably mounted transversely of one block, arms carried by said shaft, bars pivoted to said arms and having free end portions detachably engaged with the other block, and means for rotating the shaft and moving the arms to exert pull upon the bars and shift the blocks toward each other into wedging engagement with the tread portion of a tire.

WASHINGTON E. MAST.
ROBERT E. MAST.

REFERENCES CITED

The following references are of record in the file of this patent:

UNITED STATES PATENTS

| Number | Name | Date |
|---|---|---|
| 472,997 | Hayward | Apr. 19, 1892 |

FOREIGN PATENTS

| Number | Country | Date |
|---|---|---|
| 452,251 | France | Mar. 3, 1913 |